US008818811B2

(12) United States Patent
Wang

(10) Patent No.: US 8,818,811 B2
(45) Date of Patent: Aug. 26, 2014

(54) METHOD AND APPARATUS FOR PERFORMING VOICE ACTIVITY DETECTION

(71) Applicant: Huawei Technologies Co., Ltd., Guangdong (CN)

(72) Inventor: Zhe Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/924,637

(22) Filed: Jun. 24, 2013

(65) Prior Publication Data

US 2013/0282367 A1 Oct. 24, 2013

Related U.S. Application Data

(63) Continuation of application No. PCT/CN2010/080222, filed on Dec. 24, 2010.

(51) Int. Cl.
*G10L 15/04* (2013.01)
*G10L 25/93* (2013.01)

(52) U.S. Cl.
USPC ............................ 704/253; 704/210; 704/215

(58) Field of Classification Search
None
See application file for complete search history.

(56) References Cited

U.S. PATENT DOCUMENTS

| | | | | |
|---|---|---|---|---|
| 6,044,342 | A * | 3/2000 | Sato et al. | 704/233 |
| 6,415,253 | B1 * | 7/2002 | Johnson | 704/210 |
| 6,480,823 | B1 * | 11/2002 | Zhao et al. | 704/226 |
| 6,889,187 | B2 * | 5/2005 | Zhang | 704/253 |
| 7,496,505 | B2 * | 2/2009 | Manjunath et al. | 704/221 |
| 7,653,537 | B2 * | 1/2010 | Padhi et al. | 704/218 |
| 8,099,277 | B2 * | 1/2012 | Yamamoto et al. | 704/248 |
| 8,260,609 | B2 * | 9/2012 | Rajendran et al. | 704/210 |
| 8,321,217 | B2 * | 11/2012 | Sehlstedt | 704/233 |
| 2001/0014857 | A1 * | 8/2001 | Wang | 704/231 |
| 2002/0116186 | A1 * | 8/2002 | Strauss et al. | 704/233 |

(Continued)

FOREIGN PATENT DOCUMENTS

| | | |
|---|---|---|
| CN | 1166723 A | 12/1997 |
| CN | 1867965 A | 11/2006 |

(Continued)

OTHER PUBLICATIONS

Jiang, Weiwu, Wai Kit Lo, and Helen Meng. "A new voice activity detection method using maximized Sub-band SNR." Audio Language and Image Processing (ICALIP), 2010 International Conference on. IEEE, 2010.*

*Primary Examiner* — Brian Albertalli

(74) *Attorney, Agent, or Firm* — Huawei Technologies Co., Ltd

(57) ABSTRACT

This application relates to a voice activity detection (VAD) apparatus configured to provide a voice activity detection decision for an input audio signal. The VAD apparatus includes a state detector and a voice activity calculator. The state detector is configured to determine, based on the input audio signal, a current working state of the VAD apparatus among at least two different working states. Each of the at least two different working states is associated with a corresponding working state parameter decision set which includes at least one voice activity decision parameter. The voice activity calculator is configured to calculate a voice activity detection parameter value for the at least one voice activity decision parameter of the working state parameter decision set associated with the current working state, and to provide the voice activity detection decision by comparing the calculated voice activity detection parameter value with a threshold.

30 Claims, 2 Drawing Sheets

(56) References Cited

U.S. PATENT DOCUMENTS

| | | | | |
|---|---|---|---|---|
| 2007/0110263 | A1 | 5/2007 | Brox | |
| 2009/0055173 | A1 | 2/2009 | Sehlstedt | |
| 2009/0089053 | A1 | 4/2009 | Wang et al. | |
| 2010/0106490 | A1 * | 4/2010 | Svedberg et al. | 704/215 |
| 2010/0211385 | A1 | 8/2010 | Sehlstedt | |
| 2011/0035213 | A1 * | 2/2011 | Malenovsky et al. | 704/208 |
| 2011/0264447 | A1 * | 10/2011 | Visser et al. | 704/208 |
| 2011/0264449 | A1 * | 10/2011 | Sehlstedt | 704/226 |
| 2012/0185248 | A1 | 7/2012 | Sehlstedt | |
| 2012/0296641 | A1 * | 11/2012 | Rajendran et al. | 704/206 |

FOREIGN PATENT DOCUMENTS

| | | | |
|---|---|---|---|
| CN | 101154378 | A | 4/2008 |
| CN | 101236742 | A | 8/2008 |
| CN | 101790752 | A | 9/2008 |
| CN | 101379548 | A | 3/2009 |
| EP | 0790599 | A1 | 8/1997 |
| WO | 0017856 | A1 | 3/2000 |

* cited by examiner

METHOD AND APPARATUS FOR PERFORMING VOICE ACTIVITY DETECTION

CROSS-REFERENCE TO RELATED APPLICATIONS

This application is a continuation of International Application No. PCT/CN2010/080222, filed on Dec. 24, 2010, which is hereby incorporated by reference in its entirety.

TECHNICAL FIELD

This application relates to method and apparatus for performing voice activity detection, and in particular to a voice activity detection apparatus having at least two different working states and using non-linearly processed sub-band segmental signal to noise ratio parameters.

BACKGROUND

Voice activity detection (VAD) is generally a technique for detecting voice activities in a signal. Voice activity detection is also known as speech activity detection or simply speech detection. A VAD apparatus detects, in communication channels, the presence or absence of the voice activities, also referred to as active signals, such as speech or music. Networks thus can decide to compress a transmission bandwidth in periods where active signals are absent, or perform other processing according to whether there is an active signal or not. In the VAD, a feature parameter or a set of feature parameters extracted from an input audio signal is compared to corresponding threshold values, in order to determine whether the input audio signal is an active signal or not.

There have been many parameters proposed for the VAD. In general, energy based parameters are known to provide good performance. Thus, in recent years, as a kind of energy based parameters, sub-band signal to noise ratio (SNR) based parameters have been widely used for the VAD. No matter what feature parameter or feature parameters are used by a voice activity detector, these kind of parameters exhibit a weak speech characteristic at the offsets of speech bursts, thus increasing the possibility of mis-detecting speech offsets.

Usually, in order to ensure a correct detection of speech offsets, a conventional voice activity detector performs some special processing at speech offsets. A conventional way to do this special processing is to apply a "hard" hangover to a VAD decision at speech offsets, wherein a first group of frames detected as inactive by the voice activity detector at the speech offsets is forced to be active. Another possibility is to apply a "soft" hangover to the VAD decision at the speech offsets. In applying a soft hangover, the VAD decision threshold at the speech offsets is adjusted to favour speech detection for the first several offset frames of the audio signal. Accordingly, in this conventional voice activity detector, when the input signal is a non speech offset signal, the VAD decision is made in a normal way, while in an offset state the VAD decision is made in a way favouring speech detection.

Although the application of a hard hangover process in order to ensure a correct detection of the speech offsets can successfully help to diminish the possibility of a mis-detection at speech offsets, the hard hangover scheme lacks efficiency. Many real inactive frames may be unnecessarily forced to be active, thus decreasing the VAD overall performance. On the other hand, although a soft hangover processing scheme as used, for instance, by the ITU-T (International Telecommunication Union Telecommunication Standardization Sector) G.718 standardized voice activity detector improves the hangover efficiency to a higher level, the VAD performance can still be improved.

SUMMARY

According to a first aspect of the present application, a voice activity detection (VAD) apparatus for making a VAD decision on an input audio signal is provided.

The VAD apparatus includes a state detector configured to determine a current working state of the VAD apparatus based on the input audio signal. The VAD apparatus has at least two different working states. Each of the at least two different working states is associated with a corresponding working state parameter decision set (WSPDS) which includes at least one VAD parameter (VADP). The VAD apparatus also includes a voice activity calculator configured to calculate a value for the at least one VAD parameter (VADP) of the working state parameter decision set (WSPDS) associated with the current working state, and to generate the VAD decision (VADD) by comparing the calculated VAD parameter value with a threshold.

Accordingly, the VAD apparatus according to the first aspect of the present application comprises more than one working state. The VAD apparatus uses at least two different parameters or two different sets of parameters for making VAD decisions for different working states.

In a possible implementation, the VAD parameters can have the same general form but can comprise different factors. The different VAD parameters can comprise modified sub-band segmental signal to noise ratio (SNR) based parameters which are non-linearly processed in a different manner.

The number of working states used by the VAD apparatus according to the first aspect of the present application can vary. In a possible implementation of the VAD apparatus the apparatus comprises two different working states, i.e. a normal working state and an offset working state.

In a possible implementation of the VAD apparatus according to the first aspect of the present application, for each working state of the VAD apparatus, a corresponding working state parameter decision set (WSPDS) is provided each comprising at least one VAD parameter (VADP). The number and type of VAD parameters (VADPs) can vary for the different working state parameter decision sets (WSPDS) of the different working states of the VAD apparatus according to the first aspect of the present application.

In a possible implementation of the VAD apparatus according to the first aspect of the present application, the VAD decision generated by the voice activity calculator is made or calculated by using sub-band segmental signal to noise ratio (SNR) based VAD parameters (VADPs).

In a possible implementation of the VAD apparatus according to the first aspect of the present application, the VAD decision for the input audio signal is made by the voice activity calculator on the basis of the at least one VAD parameter (VADP) of the working parameter decision set (WSPDS) provided for the current working state of the VAD apparatus using a predetermined VAD processing algorithm provided for the current working state of the VAD apparatus. The used VAD processing algorithm can be reconfigured or configurable via an interface thus providing more flexibility for the VAD apparatus according to the first aspect of the present application.

In a possible implementation of the VAD apparatus according to the present application, the VAD processing algorithm used for determining the VAD decision can be configured.

In a further possible implementation of the VAD apparatus according to the first aspect of the present application, the VAD apparatus is switchable between different working states according to configurable working state transition conditions. This switching can be performed in a possible implementation under the control of the state detector.

In a possible implementation of the VAD apparatus according to the first aspect of the present application, the VAD apparatus comprises a normal working state and an offset working state and can be switched between these two different working states according to configurable working state transition conditions.

In a possible implementation of the VAD apparatus according to the first aspect of the present application, the VAD apparatus detects a change from voice activity being present to a voice activity being absent and/or switches from a normal working state to an offset working state in the input audio signal if in the normal working state of the VAD apparatus the VAD decision (VADD) made on the basis of the at least one VAD parameter (VADP) of the normal working state parameter decision set (NWSPDS) of the normal working state indicates a voice activity being present for a previous frame and a voice activity being absent in a current frame of the input audio signal.

In a possible implementation of the VAD apparatus according to the first aspect of the present application, the VADD the VAD apparatus detects in its normal working state forms an intermediate VADD ($VADD_{int}$), which may form the VADD or final VADD output by the VAD apparatus in case this intermediate VAD indicates that voice activity is present in the current frame. As described above, in case this intermediate VADD indicates that no voice activity is present in the current frame, this intermediate VADD may be used to detect a transition or change from a normal working state to an offset working state and to switch to the offset working state where the voice activity detector calculates for the current frame a voice activity voice detection parameter of the offset working state parameter decision set to generate the VADD or final VADD output by the VAD apparatus.

In a possible implementation of the VAD apparatus according to the first aspect of the present application, if the VAD apparatus detects in its normal working state that a voice activity is present in a current frame of the input audio signal this intermediate VAD decision ($VADD_{int}$) is output as a final VAD decision ($VADD_{fin}$).

In a further possible implementation of the VAD apparatus according to the first aspect of the present application, if the VAD apparatus detects in its normal working state that a voice activity is present in the previous frame and that a voice activity is absent in a current frame of the input signal it is switched from its normal working state to an offset working state wherein the VAD decision is made on the basis of the at least one VAD parameter of the offset working state parameter decision set (OWSPDS).

In a still further possible implementation of the VAD apparatus according to the first aspect of the present application, the VAD decision generated in the offset working state of the VAD apparatus forms the final VADD or VAD decision output by the VAD apparatus if the VAD decision generated on the basis of the at least one VAD parameter (VADP) of the offset working state parameter decision set (OWSPDS) indicates that a voice activity is present in the current frame of the input audio signal.

In a still further possible implementation of the VAD apparatus according to the first aspect of the present application, the VAD decision made in the offset working state of the VAD apparatus forms an intermediate VAD decision ($VAD_{int}$) if the VAD decision made on the basis of the at least one VAD parameter (VADP) of the offset working state parameter decision set (OWSPDS) indicates that a voice activity is absent in the current frame of the input audio signal.

In a possible implementation of the VAD apparatus according to the first aspect of the present application, the intermediate VAD decision ($VADD_{int}$) undergoes a hard hangover processing to provide a final VAD decision ($VADD_{fin}$).

In a further possible implementation of the VAD apparatus according to the first aspect of the present application, the VAD apparatus is switched from the normal working state to the offset working state if the VAD decision generated by the voice activity calculator of the VAD apparatus in the normal working state using a VAD processing algorithm and the working state parameter decision set (NWSPDS) provided for the normal working state indicates an absence of voice in the input audio signal and a soft hangover counter (SHC) exceeds a predetermined threshold counter value.

In a further possible implementation of the VAD apparatus according to the first aspect of the present application, the VAD apparatus is switched from the offset working state to the normal working state if the soft hangover counter (SHC) does not exceed a predetermined threshold counter value.

In a possible implementation of the VAD apparatus according to the first aspect of the present application, the input audio signal includes a sequence of audio signal frames and the soft hangover counter (SHC) is decremented in the offset working state of the VAD apparatus for each received audio signal frame until the predetermined threshold counter value is reached.

In a possible implementation of the VAD apparatus according to the first aspect of the present application, if a predetermined number of consecutive active audio signal frames of the input audio signal is detected the soft hangover counter (SHC) is reset to a counter value depending on a long term signal to noise ratio (1SNR) of the input audio signal.

In a possible implementation of the VAD apparatus according to the first aspect of the present application, an active audio signal frame is detected if a calculated voice metric of the audio signal exceeds a predetermined voice metric threshold value and a pitch stability of the audio signal frame is below a predetermined stability threshold value.

In a possible implementation of the VAD apparatus according to the first aspect of the present application, the VAD parameters of a working state parameter decision set (WSPDS) of a working state of the activity detection apparatus comprises energy based decision parameters and/or spectral envelope based parameters and/or entropy based decision parameters and/or statistic based decision parameters.

In a further possible implementation of the VAD apparatus according to the first aspect of the present application, an intermediate VAD decision ($VADD_{int}$) generated by the voice activity calculator of the VAD apparatus is applied to a hard hangover processing unit performing a hard hangover of the applied intermediate VAD decision ($VADD_{int}$).

According to a second aspect of the present application, an audio signal processing device is provided. The device comprises a voice activity detection apparatus and an audio signal processing unit controlled by a voice activity detecting decision generated by the voice activity detection apparatus, wherein the voice activity detection apparatus configured to determine a current working state of at least two different working states of the voice activity detection apparatus dependent on the input audio signal wherein each of the at least two different working states is associated with a corresponding working state parameter decision set (WSPDS) including at least one voice activity decision parameter (VADP); and to calculate a voice activity detection parameter value for the at least one VADP of the working state parameter decision set (WSPDS) associated with the current working state and to generate the voice activity detection decision by comparing the calculated voice activity detection parameter value of the respective voice activity decision parameter (VADP) with a threshold.

According to a third aspect of the present application, a method for performing a VAD is provided. The method comprises:

receiving an input audio signal;

determining a current working state of the VAD apparatus based on the input audio signal, wherein the VAD apparatus has at least two different working states, each of the at least two different working states is associated with a corresponding working state parameter decision set (WSPDS), and each WSPDS includes at least one voice activity decision parameter (VADP);

calculating a value for the at least one VADP of the WSPDS associated with the current working state; and generating a voice activity detection decision (VADD) by comparing the calculated VADP value with a threshold.

BRIEF DESCRIPTION OF THE DRAWINGS

In the following, possible implementations of different aspects of the present application are described with reference to the enclosed figures in which.

DETAILED DESCRIPTION OF EMBODIMENTS

Figure 1:
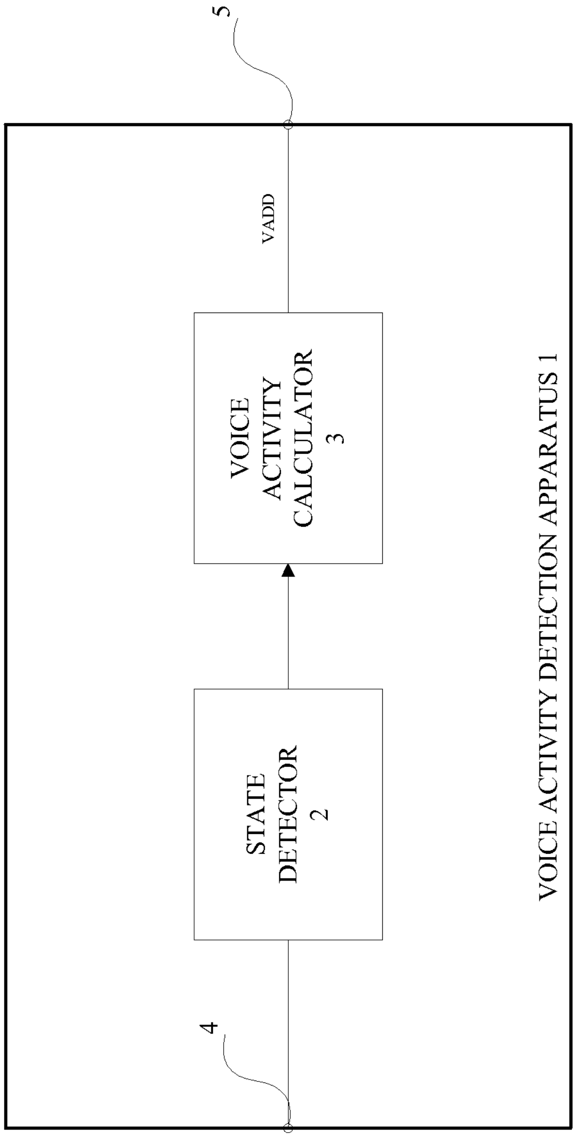
FIG. 1 is a simplified block diagram of a VAD apparatus according to a possible implementation of the first aspect of the present application.

FIG. 1 shows a simplified block diagram of a VAD apparatus according to a first aspect of the present application. As can be seen in FIG. 1, the VAD apparatus 1 comprises, in an exemplary implementation, a state detector 2 and a voice activity calculator 3. The VAD apparatus 1 is configured to generate a VAD decision for an input audio signal received via an input 4 of the VAD apparatus 1. The VAD decision is output at an output 5 of the VAD apparatus 1. The state detector 2 is configured to determine a current working state of the VAD apparatus 1 based on the input audio signal applied to the input 4. The VAD apparatus 1 according to the first aspect of the present application has at least two different working states. In a possible implementation, the VAD apparatus 1 may have, for example, two working states. Each of the at least two different working states is associated with a corresponding working state parameter decision set (WSPDS) which includes at least one VAD parameter.

The voice activity calculator 3 is configured to calculate a VAD parameter value for the at least one VAD parameter of the WSPDS associated with the current working state of the VAD apparatus 1. This calculation is performed in order to provide a VAD decision by comparing the calculated VAD parameter value of the at least one VAD parameter with a corresponding threshold.

The state detector 2 as well as the voice activity calculator 3 of the VAD apparatus 1 can be hardware or software implemented. The VAD apparatus 1 according to the first aspect of the present application has more than one working state. At least two different VAD parameters or two different sets of VAD parameters are used by the VAD apparatus 1 for generating the VAD decision for different working states.

The VAD decision for the input audio signal by the voice activity calculator 3 is generated, in a possible implementation, on the basis of at least one VAD parameter of the WSPDS provided for the current working state of the VAD apparatus 1 using a predetermined VAD processing algorithm provided for the current working state of the VAD apparatus 1. The state detector 2 detects the current working state of the VAD apparatus 1. The determination of the current working state is performed by the state detector 2 dependent on the received input audio signal. In a possible implementation, the VAD apparatus 1 is switchable between different working states according to configurable working state transition conditions. In a possible implementation, the VAD apparatus 1 has two working states, i.e. a normal working state and an offset working state.

In a possible implementation of the VAD apparatus 1 according to the first aspect of the present application, the VAD apparatus 1 detects a change from a voice activity being present to a voice activity being absent in the input audio signal if a corresponding condition is met. If in the normal working state of the VAD apparatus 1 the VAD decision generated by the voice activity calculator 3 of the VAD apparatus 1 on the basis of the at least one VAD parameter (VADP) of the normal working state parameter decision set (NWSPDS) of the normal working state indicates a voice activity being present for a previous frame and a voice activity being absent in a current frame of the input audio signal, the VAD apparatus 1 detects a change from voice activity being present in the input audio signal to a voice activity being absent in the input audio signal.

In a possible implementation of the VAD apparatus 1 according to the first aspect of the present application, if the VAD apparatus 1 detects, in its normal working state, that a voice activity is present in a current frame of the input audio signal, an intermediate VAD decision ($VADD_{int}$) can be output as a final VAD decision ($VADD_{fin}$) at the output 5 of the VAD apparatus 1 for further processing.

In a further possible implementation of the VAD apparatus 1 according to the first aspect of the present application, if the VAD apparatus 1 detects in its normal working state that a voice activity is present in the previous frame of the input audio signal and that a voice activity is absent in a current frame of the input audio signal, the VAD apparatus is switched automatically from its normal working state to an offset working state. In the offset working state, the VAD decision is generated by the voice activity calculator 3 on the basis of the at least one VADP of the offset working state parameter decision set (OWSPDS). The VAD parameters (VADPs) of the different working state parameter decision sets (WSPDS) can be stored in a possible implementation in a configuration memory of the VAD apparatus 1.

In a possible implementation of the VAD apparatus 1 according to the first aspect of the present application, the VAD decision generated by the voice activity calculator 3 in the offset working state forms an intermediate VAD decision ($VADD_{int}$) if the VAD decision generated on the basis of the at least one VADP of the OWSPDS indicates that a voice activity is absent in the current frame of the input audio signal. In a possible implementation this generated intermediate VAD decision undergoes a hard hangover processing before it is output as a final VAD decision ($VADD_{fin}$) at the output 5 of the VAD apparatus 1.

In a possible implementation of the VAD apparatus 1 according to the first aspect of the present application, the VAD apparatus 1 is switched automatically from the normal working state to the offset working state if the VAD decision generated by the voice activity calculator 3 of the VAD apparatus 1 in the normal working state using a VAD processing algorithm and the WSPDS provided for this normal working state indicates an absence of voice in the input audio signal and if a soft hangover counter (SHC) exceeds at the same time a predetermined threshold counter value.

In a further possible implementation of the VAD apparatus 1 according to the first aspect of the present application, the VAD apparatus 1 is switched from the offset working state to the normal working state if the SHC does not exceed at the same time a predetermined threshold counter value.

The input audio signal applied to the input 4 of the VAD apparatus 1 includes, in a possible implementation, a sequence of audio signal frames wherein the SHC employed by the VAD apparatus 1 is decremented in the offset working state of the VAD apparatus 1 for each received audio signal frame until the predetermined threshold counter value is reached. In a possible implementation, if a predetermined number of consecutive active audio signal frames of the input audio signal is detected, the SHC is reset to a counter value depending on a long term signal to noise ratio (LSNR) of the received input audio signal. The LSNR can be calculated by a long term signal to noise ratio estimation unit of the VAD apparatus 1. In a possible implementation of the VAD apparatus 1 according to the first aspect of the present application an active audio signal frame is detected if a calculated voice metric of the audio signal frame exceeds a predetermined voice metric threshold value and a pitch stability of the audio signal frame is below a predetermined stability threshold value.

In a possible implementation of the VAD apparatus 1 according to the first aspect of the present application the VAD parameters VADPs of a working state parameter decision set WSPDS of a working state of the VAD apparatus 1 can comprise energy based decision parameters and/or spectral envelope based decision parameters and/or entropy based decision parameters and/or statistic based decision parameters. In a specific implementation of the VAD apparatus 1 according to the first aspect of the present application, the VAD decision made by the voice activity calculator 3 uses sub-band segmental signal to noise ratio (SNR) based VAD parameters VADPs.

In a further possible implementation of the VAD apparatus 1, an intermediate VAD decision generated by the voice activity calculator 3 of the VAD apparatus 1 can be applied to a further hard hangover processing unit performing a hard hangover of the applied intermediate VAD decision.

The VAD apparatus 1 according to the first aspect of the present application can comprise in a possible implementation two operation states wherein the VAD apparatus 1 operates either in a normal working state or in a offset working state. A speech offset is a short period at the end of the speech burst within the received audio signal. Thus, a speech offset contains relatively low speech energy. A speech burst is a speech period of the input audio signal between two adjacent speech pauses. The length of a speech offset typically extends over several continuous signal frames and can be sample dependent. The VAD apparatus 1 according to the first aspect of the present application continuously identifies the starts of speech offsets in the input audio signal and switches from the normal working state to the offset working state when a speech offset is detected and switches back to the normal working state when the speech offset state ends. The VAD apparatus 1 selects one VAD parameter or a set of parameters for the normal working state and another VAD parameter or set of parameters for the offset working state. Accordingly, with a VAD apparatus 1 according to the first aspect of the present application different VAD operations are performed for different parts of the received audio signal and specific VAD operations are performed for each working state. The VAD apparatus 1 according to the first aspect of the present application performs a speech burst and offset detection in the received audio input signal wherein the offset detection can be performed in different ways according to different implementations of the VAD apparatus 1.

In a possible implementation of the VAD apparatus 1, the input audio signal is segmented into signal frames and inputted to the VAD apparatus 1 at input 4. The input audio signal can, for example, comprise signal frames of 20 ms in length. In a possible specific implementation for each input signal frame, an open loop pitch analysis can be performed twice each for a sub-frame having 10 ms in length. The pitch lags searched for the two sub-frames of each input frame are denoted as T(0) and T(1), respectively, and the corresponding correlations are denoted respectively as voicing(0) and voicing(1). The voicing metric of the audio signal frame V(0) is calculated by:

$$V(0)=(\text{voicing}(-1)+\text{voicing}(0)+\text{voicing}(1))/3+\text{corr\_shift}$$

where voicing(−1) represents the corresponding correlation as a pitch lag of the second sub-frame of the previous input signal frame, and corr_shift is a compensation value depending on the background noise level.

The pitch stability (S) of the audio signal frame can be calculated by:

$$S_T(0)=[\text{abs}(T(-1)-T(-2))+\text{abs}(T(0)-T(-1))+\text{abs}(T(1)-T(0))]/3$$

wherein T(−1), T(−2) are the first and second pitch lags of the previous input signal frame, and abs( ) means the absolute value. In a possible specific implementation, the input frame is considered as a voice frame or active frame when the following condition is met:

$$V(0)>0.65\&\&S_T(0)<14$$

In a possible implementation, if three consecutive active frames are detected, a voiced burst of the input audio signal is detected and a soft hangover counter (SHC) is reset to non-zero value determined depending on the signal long term SNR (LSNR). When the VAD apparatus 1 according to the first aspect of the present application is working in a normal working state and the determined intermediate VAD decision falls after previous frames have been classified or determined as active to inactive for a current signal frame and if the soft hangover counter SHC is greater than 0 the input audio signal is assumed to enter a speech offset and the VAD apparatus 1 switches from the normal working state into the offset working state. The length of the soft hangover counter SHC defines the length of the VAD offset working state. In a possible implementation the soft hangover counter SHC is decremented or elapsed by one at each signal frame within the VAD speech offset working state. The speech offset working state of the VAD apparatus 1 ends when the software hangover counter SHC decrements to a predetermined threshold value such as 0 and the VAD apparatus 1 switches back to its normal working state at the same time.

In a possible specific implementation three parameters are used by the VAD apparatus 1 for making an intermediate VAD decision $VADD_{int}$. One parameter is the voicing metric (V−1) of the preceding frame and the two other parameters are given by:

$$mssnr_{nor}=\begin{cases}\sum_i^N (snr(i)+\alpha)^4 & snr(i)+\alpha\geq 1,\ lnsr>18\\ \sum_i^N (snr(i)+\alpha)^{10} & snr(i)+\alpha\geq 1,\ 8<lnsr\leq 18\\ \sum_i^N (snr(i)+\alpha)^{15} & snr(i)+\alpha\geq 1,\ lnsr\leq 8\\ \sum_i^N (snr(i)+\alpha)^{9} & \text{otherwise}\end{cases}$$

$$mssnr_{off}=\begin{cases}\sum_i^N (snr(i)+\alpha+\beta)^4 & snr(i)+\alpha\geq 1,\ lnsr>18\\ \sum_i^N (snr(i)+\alpha+\beta)^{10} & snr(i)+\alpha\geq 1,\ 8<lnsr\leq 18\\ \sum_i^N (snr(i)+\alpha+\beta)^{15} & snr(i)+\alpha\geq 1,\ lnsr\leq 8\\ \sum_i^N (snr(i)+\alpha+\beta)^{9} & \text{otherwise}\end{cases}$$

wherein snr(i) is the modified log SNR of the $i^{th}$ spectral sub-band of the input signal frame, N is the number of sub-bands per frame, lsnr is the long term SNR estimate, and α, β are two configurable coefficients.

The first coefficient α can be determined in a possible implementation by:

$$\alpha=f(i,l\text{snr})=\alpha(i)l\text{snr}+b(i)$$

where a(i) and b(i) are two real or floating numbers determined by the sub-band index i. The second coefficient β can be determined by the voicing metric V(−1) wherein if V(−1)>0.65 β=0.2 and if V(−1)≤0.65 β=0.1.

In a possible implementation, the calculation of the SNR of each sub-band snr(i) is given by:

$$snr(i)=\log_{10}\left(\frac{E(i)}{E_n(i)}\right)$$

wherein E(i) is the energy of the $i^{th}$ sub-band of the input frame, $E_n(i)$ is the energy of the $i^{th}$ sub-band of the background noise estimate.

In a possible implementation, the energy of each sub-band of the background noise estimate can be estimated by moving averaging the energies of each sub-band among background noise frames detected as follows:

$$E_n(i)=\lambda\cdot E_n(i)+(1-\lambda)\cdot E(i)$$

wherein E(i) is the energy of the $i^{th}$ sub-band of the frame detected as background noise, λ is a forgetting factor usually in a range between 0.9-0.99. The power spectrum related in the above calculation can in a possible implementation be obtained by a fast Fourier transformation (FFT).

In the normal working state the VAD apparatus 1 according to the first aspect of the present application the apparatus uses the modified segmental SNR $mssnr_{nor}$ to make an intermediate VAD decision $VADD_{int}$. This intermediate VAD decision $VADD_{int}$ can be made by comparing the calculated modified segmental SNR $mssnr_{nor}$ to a threshold thr which can be determined by:

$$thr=\begin{cases}135 & lnsr>18\\ 35 & 8<lnsr\leq 18\\ 10 & lnsr\leq 8\end{cases}$$

The intermediate VAD decision $VADD_{int}$ is active if the modified SNR $msnr_{nor}$>thr, otherwise the intermediate VAD decision $VADD_{int}$ is inactive.

In the speech offset state the VAD apparatus 1 uses in a possible implementation both the modified SNR $msnr_{off}$ and the voice metric V(−1) for making an intermediate VAD decision $VADD_{int}$. The intermediate VAD decision $VADD_{int}$ is made as active if the modified segmental SNR $mssnr_{off}$>thr or the voice metric V(−1)>a configurable threshold value of e.g. 0.7, otherwise the intermediate VAD decision $VADD_{int}$ is made as inactive.

In a possible implementation, a hard hangover can be optionally applied to the intermediate VAD decision $VADD_{int}$. In this specific implementation if a hard hangover counter HHC is greater than a predetermined threshold such as 0 and if the intermediate VAD decision $VADD_{int}$ is inactive the final VAD decision $VADD_{fin}$ is forced to active and the hard hangover counter HHC is decremented by 1. In a possible implementation the hard hangover counter HHC is reset to its maximum value according to the same rule applied to the soft hangover counter SHC resetting.

In a still further possible implementation of the VAD apparatus 1 according to the first aspect of the present application, the VAD apparatus 1 selects in this specific implementation only two VAD parameters for its intermediate VAD decision, i.e. $mssnr_{nor}$ and $mssnr_{off}$.

$$mssnr_{nor}=\begin{cases}\sum_i^N (snr(i)+\alpha)^4 & snr(i)+\alpha\geq 1,\ lnsr>18\\ \sum_i^N (snr(i)+\alpha)^{9} & snr(i)+\alpha\geq 1,\ 8<lnsr\leq 18\\ \sum_i^N (snr(i)+\alpha)^{13} & snr(i)+\alpha\geq 1,\ lnsr\leq 8\end{cases}$$

$$mssnr_{off}=\begin{cases}\sum_i^N (snr(i)+\alpha+\beta)^5 & lnsr>18\\ \sum_i^N (snr(i)+\alpha+\beta)^{11} & 8<lnsr\leq 18\\ \sum_i^N (snr(i)+\alpha+\beta)^{15} & lnsr\leq 8\end{cases}$$

wherein the modified segmental SNR $mssnr_{nor}$ is used in the normal working state and the modified segmental SNR $mssnr_{off}$ is used in the offset working state. The coefficient β is determined in this implementation not only by the metric V(−1) but also by the sub-band index i wherein for the sub-band index i greater than an integer value of m, if V(−1)>0.65 the coefficient β is set to 0.2 otherwise the coefficient β is set to 0.1. Further, for the sub-band index i being not greater than m if V(−1)>0.65 the second coefficient β is set to β=0.2/+1.5 otherwise the second coefficient β is set to 0.1·1.5. In this specific embodiment another set of thresholds are defined for the offset working state to be different from the set of thresholds thr for the normal working state.

Figure 2:
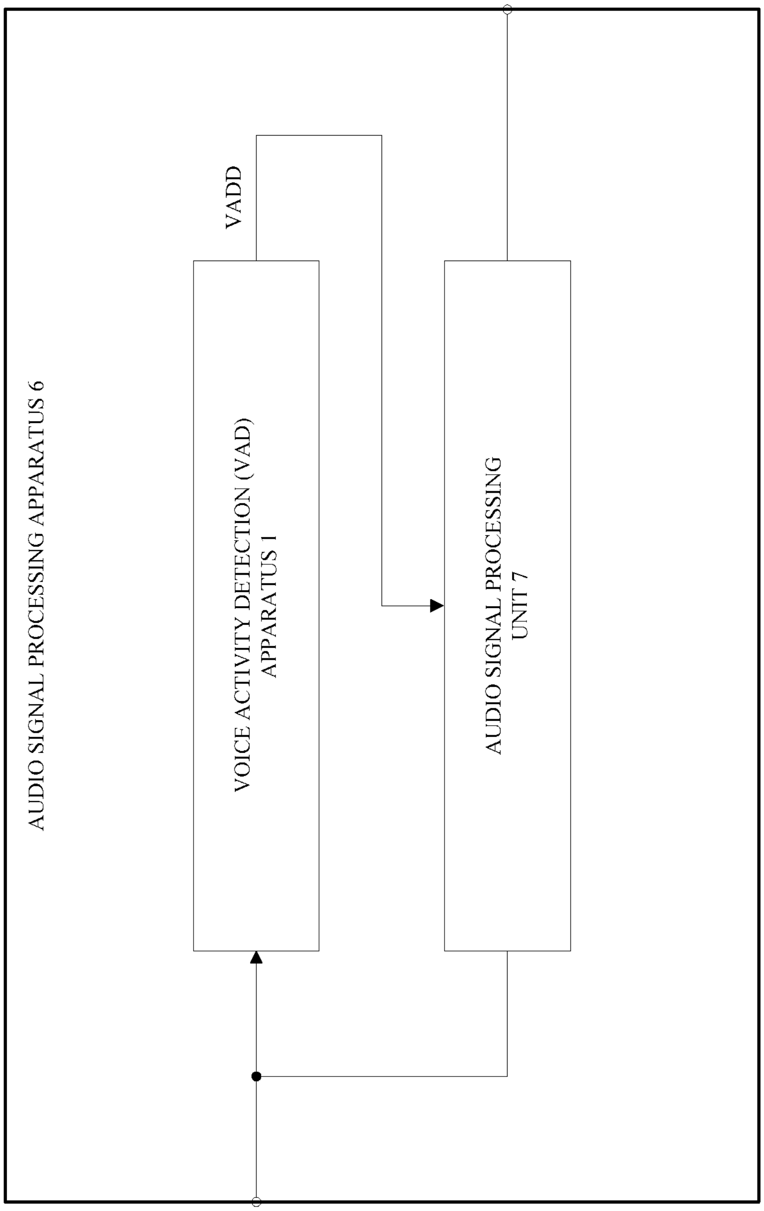
FIG. 2 is a simplified block diagram of an audio signal processing apparatus according to a possible implementation of the second aspect of the present application.

The application further provides, as a second aspect, an audio signal processing apparatus. As shown in FIG. 2, the audio signal processing apparatus comprises a VAD apparatus 1, supplying a final VAD decision to an audio signal processing unit 7 of the audio signal processing apparatus 6. Accordingly, the audio signal processing unit 7 is controlled by a VAD decision generated by the VAD apparatus 1. The audio signal processing unit 7 can perform different kinds of audio signal processing on the applied audio signal such as speech encoding depending on the VAD decision.

According to a third aspect, the present application provides a method for performing a VAD wherein the VAD decision is calculated by a VAD apparatus for an input audio signal using at least one VAD parameter VADP of a working state parameter decision set WSPDS of a current working state detected by a state detector of the VAD apparatus.

According to a possible implementation of the method, an input frame of the applied input audio signal is received. Then, a signal type of the input signal can be identified from a set of predefined signal types. In a further step a working state of the VAD apparatus is selected or chosen among several possible working states according to the identified input signal type. In a further step the VAD parameters are selected corresponding to the selected working state of the VAD apparatus among a larger set of predefined VAD decision parameters. Finally, a VAD decision is made based on the chosen or selected VAD parameters.

A possible implementation of the method according to a third aspect of the present application the set of predefined signal types can include a speech offset type and a non-speech offset type. Several possible working states can include a state for speech offset defined as a short period of the applied audio signal at the end of the speech bursts. The speech offset can be identified typically by a few frames immediately after the intermediate decision of the VAD apparatus working in the non-speech offset working state falls to inactive from active in a speech burst. A speech burst can be detected e.g. when a more than 60 ms long active speech signal is detected. In a possible implementation of the method according to the third aspect of the present application the set of predefined VAD parameters can include sub-band segmental SNR based parameters with different forms. In a possible implementation the sub-band segmental SNR based parameters with different forms are sub-band segmental SNR parameters processed by different non-linear functions.

What is claimed is:

1. A voice activity detection (VAD) apparatus, comprising:

a receiving unit, configured to receive an input audio signal;

a state detector, configured to determine a current working state of the VAD apparatus based on the input audio signal, wherein the VAD apparatus has at least two different working states, each of the at least two different working states is associated with a corresponding working state parameter decision set (WSPDS), and each WSPDS includes at least one voice activity decision parameter (VADP); wherein the working states of the VAD apparatus comprise a normal working state and an offset working state;

a voice activity calculator, configured to calculate a value for the at least one VADP of the WSPDS associated with the current working state, and to generate a voice activity detection decision (VADD) by comparing the calculated VADP value with a threshold; and an output unit, configured to output the VADD.

2. The VAD apparatus according to claim 1, wherein the VADD is generated by the voice activity calculator by using sub-band segmental signal to noise ratio (SNR) based voice activity decision parameters (VADPs).

3. The VAD apparatus according to claim 1, wherein the value of the at least one VADP of the WSPDS associated with the current working state is calculated using a predetermined voice activity detection processing algorithm provided for the current working state of the VAD apparatus.

4. The VAD apparatus according to claim 1, wherein the VAD apparatus is switchable between different working states according to configurable working state transition conditions.

5. The VAD apparatus according to claim 1, wherein in the normal working state of the VAD apparatus, if the VADD indicates a voice activity being present in a previous frame of the input audio signal and a voice activity being absent in a current frame of the input audio signal, a change from voice activity being present to voice activity being absent in the input audio signal is detected.

6. The VAD apparatus according to claim, wherein if, in the normal working state of the VAD apparatus, it is detected that a voice activity is present in a previous frame of the input audio signal and a voice activity is absent in a current frame of the input audio signal, the VAD apparatus is switched from the normal working state to the offset working state.

7. The VAD apparatus according to claim 1, wherein the VADD generated in the offset working state is an intermediate voice activity detection decision ($VADD_{int}$) if the VADD indicates that a voice activity is absent in the current frame of the input audio signal.

8. The VAD apparatus according to claim 7, wherein the $VADD_{int}$ undergoes a hard hangover processing to provide a final voice activity detection decision ($VADD_{fin}$).

9. The VAD apparatus according to claim 1, wherein the VAD apparatus is switched from the normal working state to the offset working state if the VADD generated by the voice activity calculator in the normal working state indicates an absence of voice activity in the input audio signal and a soft hangover counter (SHC) exceeds a predetermined threshold counter value.

10. The VAD apparatus according to claim 1, wherein the VAD apparatus is switched from the offset working state to the normal working state if a soft hangover counter (SHC) does not exceed a predetermined threshold counter value.

11. The VAD apparatus according to claim 9, wherein the input audio signal includes a sequence of audio signal frames and the SHC is decremented in the offset working state for each received audio signal frame until the predetermined threshold counter value is reached.

12. The VAD apparatus according to claim 9, wherein if a predetermined number of consecutive active audio signal frames of the input audio signal is detected, the SHC is reset to a counter value depending on a long-term signal to noise ratio (LSNR) of the input audio signal.

13. The VAD apparatus according to claim 9, wherein an active audio signal frame is detected if a calculated voice metric of the audio signal frame exceeds a predetermined voice metric threshold value and a pitch stability of the audio signal frame is below a predetermined stability threshold value.

14. The VAD apparatus according to claim 1, wherein the one or more VADP of the WSPDS of the working state of the VAD apparatus comprises one or more of:

one or more energy based decision parameters, one or more spectral envelope based decision parameters, and one or more statistic based decision parameters.

15. The VAD apparatus according to claim 8, further comprising a hard handover processing unit, wherein the intermediate voice activity detection decision ($VADD_{int}$) generated by the voice activity calculator is applied to the hard hangover processing unit for performing a hard hangover of the applied $VADD_{int}$.

16. An audio signal processing device, comprising:

a voice activity detection (VAD) apparatus and an audio signal processing unit controlled by a voice activity detecting decision (VADD) generated by the VAD apparatus, wherein the VAD apparatus has at least two different working states, each of the at least two different working states is associated with a corresponding working state parameter decision set (WSPDS), and each WSPDS includes at least one voice activity decision parameter (VADP), wherein the working states of the VAD apparatus comprise a normal working state and an offset working state; and wherein the VAD apparatus is configured to receive an input audio signal, determine a current working state of the VAD apparatus based on the input audio signal, calculate a value for the at least one VADP of the WSPDS associated with the current working state, generate a voice activity detection decision (VADD) by comparing the calculated VADP value with a threshold, and output the VADD.

17. A voice activity detection (VAD) method for use by a VAD apparatus, comprising:

receiving an input audio signal;

determining a current working state of the VAD apparatus based on the input audio signal, wherein the VAD apparatus has at least two different working states, each of the at least two different working states is associated with a corresponding working state parameter decision set (WSPDS), and each WSPDS includes at least one voice activity decision parameter (VADP); wherein the working states of the VAD apparatus comprise a normal working state and an offset working state;

calculating a value for the at least one VADP of the WSPDS associated with the current working state; and generating a voice activity detection decision (VADD) by comparing the calculated VADP value with a threshold.

18. The method according to claim 15, wherein the VADD is generated by using sub-band segmental signal to noise ratio (SNR) based voice activity decision parameters (VADPs).

19. The method according to claim 15, wherein the value of the at least one VADP of the WSPDS associated with the current working state is calculated using a predetermined voice activity detection processing algorithm provided for the current working state of the VAD apparatus.

20. The method according to claim 15, wherein the VAD apparatus is switchable between different working states according to configurable working state transition conditions.

21. The method according to claim 15, wherein in the normal working state of the VAD apparatus, if the VADD indicates a voice activity being present in a previous frame of the input audio signal and a voice activity being absent in a current frame of the input audio signal, a change from voice activity being present to voice activity being absent in the input audio signal is detected.

22. The method according to claim 15, further comprising:

when, in the normal working state of the VAD apparatus, it is detected that a voice activity is present in a previous frame of the input audio signal and a voice activity is absent in a current frame of the input audio signal, switching the VAD apparatus from the normal working state to the offset working state.

23. The method according to claim 15, wherein the VADD generated in the offset working state is an intermediate voice activity detection decision ($VADD_{int}$) if the VADD indicates that a voice activity is absent in the current frame of the input audio signal.

24. The method according to claim 23, further comprising:

processing the $VADD_{int}$ in a hard hangover process to provide a final voice activity detection decision ($VADD_{fin}$).

25. The method according to claim 15, further comprising:

when the VADD generated in the normal working state indicates an absence of voice activity in the input audio signal and a soft hangover counter (SHC) exceeds a predetermined threshold counter value, switching the VAD apparatus from the normal working state to the offset working state.

26. The method according to claim 15, further comprising:

when a soft hangover counter (SHC) does not exceed the predetermined threshold counter value, switching the VAD apparatus from the offset working state to the normal working state.

27. The method according to claim 25, wherein the input audio signal includes a sequence of audio signal frames, and the method further comprises:

decrementing the SHC in the offset working state for each received audio signal frame until the predetermined threshold counter value is reached.

28. The method according to claim 25, further comprising:

if a predetermined number of consecutive active audio signal frames of the input audio signal is detected, resetting the SHC to a counter value depending on a long-term signal to noise ratio (LSNR) of the input audio signal.

29. The method according to claim 22, wherein an active audio signal frame is detected if a calculated voice metric of the audio signal frame exceeds a predetermined voice metric threshold value and a pitch stability of the audio signal frame is below a predetermined stability threshold value.

30. The method according to claim 17, wherein the one or more VADP of the WSPDS of the working state of the VAD apparatus comprises one or more of:

one or more energy based decision parameters, one or more spectral envelope based decision parameters, and one or more statistic based decision parameters.

* * * * *